United States Patent [19]
Plantan

[11] 4,230,373
[45] Oct. 28, 1980

[54] BRAKE SYSTEM
[75] Inventor: Ronald S. Plantan, Wickliffe, Ohio
[73] Assignee: White Motor Corporation, Farmington Hills, Mich.
[21] Appl. No.: 965,416
[22] Filed: Dec. 1, 1978
[51] Int. Cl.³ .............................................. B60T 8/26
[52] U.S. Cl. ........................................ 303/7; 303/6 C
[58] Field of Search ....................... 303/6 C, 7, 9, 40
[56] References Cited
U.S. PATENT DOCUMENTS
3,190,700  6/1965  Fites ............................... 303/7 X Primary Examiner—Duane A. Reger
Attorney, Agent, or Firm—Watts, Hoffmann, Fisher & Heinke Co.

[57] ABSTRACT

A brake system for a tractor unit of a tractor-trailer vehicle which includes a ratio and proportioning apparatus responsive to trailer attached and trailer detached conditions. The proportioning apparatus communicates with a conduit conveying supply pressure to a trailer carried brake system and effects a reduction of the pressure applied to the rear brake actuators when a trailer is not attached. The proportioning function of the ratio and proportioning apparatus is sensitive to, and modified by, reservoir pressure and can be overridden by the vehicle operator regardless of the vehicle operating mode. The preferred brake system also includes a front dual mode relay valve which is operative to reduce the pressure applied to the front brake actuators, relative to that applied to the rear brake actuators, when a trailer is attached to the tractor.

23 Claims, 5 Drawing Figures

BRAKE SYSTEM

BACKGROUND OF THE INVENTION

This invention relates generally to brake systems for tractor-trailer type vehicles and in particular a tractor brake system in whch the front-to-back braking ratio is automatically modified when the tractor is operating without a trailer.

Present day tractor-trailer brake systems are generally pneumatically operated. The wheel brakes are energized by actuators, one of which is mounted at or near each wheel. The flow of pressure to these actuators is controlled by an operator actuated treadle valve. In some systems, the output pressure of the treadle valve is conveyed directly to the actuators, whereas in other systems, the treadle valve merely generates a signal pressure which is conveyed to a relay valve which in turn controls or modulates the flow of a reservoir pressure to the brake actuators.

Optimum braking rates for the various wheel assemblies will be dependent on the operating mode of the vehicle. In a heavily loaded vehicle, the trailer brakes and rear tractor brakes should be responsible for a greater portion of the braking. This is necessary to effect controlled braking and to reduce the possibility of premature wheel lockup.

When the tractor is operated without a trailer or, using industry parlance, when the tractor is operated "bobtail", the premature wheel lockup of the rear tractor wheels is of concern. The lockup of the rear tractor wheels can result in wheel hop and even lateral skidding of the vehicle.

Wheel hop generally increases the braking distance of the tractor. The loss of adhesion between vehicle tire and road surface is the most obvious cause of the extended braking distance. It has been reported that in some instances, the operator's reflex action to the wheel hop, is the removal or reduction of brake pedal foot pressure. This operator action, substantially increases the braking distance for it reduces the braking contribution of the front wheels as well as the hopping rear wheels.

One proposed method of solving this problem is the incorporation of anti-skid devices on the various wheel assemblies. These anti-skid devices generally include electronics which monitor wheel speed prior to and during braking and reduce pressure to the brake actuators should wheel lockup be imminent. At least a portion of the electronics used in these systems is generally mounted in or near the wheel assemblies. It should be readily apparent that as a result of their mounting location they are exposed to adverse environments including temperature extremes, rain, snow, road salt, and solvents used to clean vehicles for service. Additionally, they are exposed to vibration when the vehicles are in use. These factors result in frequency servicing being required not only in the electronics, but also in the interconnections and wiring among the various components.

Anti-skid devices, like anything which is electronic or mechanical, can fail. Failure of an anti-skid system may not be manifested until the vehicle operator encounters a severe braking situation. The failure during severe braking may result in unexpected wheel lockup and therefore an undesirable situation.

Because these systems generally involve sophisticated electronics to process and interpret the signals being generated by the sensors, they can significantly increase the initial cost of the vehicle. Repair of these devices is not only expensive, but should only be done by properly trained technicians. It may be difficult to obtain a system repair when on the road and down time for the repair can be excessive.

In summation electronic anti-skid devices are disliked by many vehicle operators because, in the view of those operators, these devices detract significantly from the profitability of a trucking operation. It is not just the original cost and the cost of service, but more importantly, the substantial loss of operating revenues due to the vehicle down time over the life of the vehicle.

In addition to anti-skid systems, systems have been suggested which allow the operator to manually adjust or select braking ratios of the various wheels. In general, these systems involve adjustable valves or provide adjustable biasing of control valves. In the case of the latter the operator is then provided with an adjustment, in some cases poppet-type valves, to control the amount of biasing. It should be readily apparent that the change in braking ratios is not accomplished automatically but requires action by the vehicle operator.

Operator adjustable braking ratios are now precluded for many vehicles by Federal statute or regulations. These regulations mandate that a vehicle be able to stop within specified distances in a controlled manner and do so without operator intervention to adjust for vehicle operating conditions.

Several prior art proposals have also been suggested which do not modify braking ratios but only modify the "feel" of the braking system when operating without a trailer. This brake feel is in actuality the sensitivity of the operator controlled treadle valve. The problem addressed by this proposal is the over-braking that may occur when the tractor is operated without a trailer. This over-braking is caused by the excessive depression of the treadle valve by the operator who is conditioned to braking the tractor-trailer combination. Less depression of the treadle valve is necessary to stop the tractor alone than is needed to stop the tractor-trailer combination. An operator accustomed to the effort necessary to brake a tractor-trailer vehicle combination may find himself over-braking the tractor when operating without a trailer.

The proposed system discloses a method by which pressure going to the trailer is monitored. This pressure is used to control a reaction piston which acts against the operator foot force being applied to the treadle valve. The absence of a trailer, results in atmospheric pressure being present in the conduit conveying fluid pressure to the trailer. This proposed system utilizes this absence of fluid pressure to effect a maximum reaction force against the operator applied force. This increases the effort necessary to depress the brake treadle valve and is intended to reduce the tendency of the operator to over-depress the brake treadle valve.

SUMMARY OF THE INVENTION

The present invention provides a new and useful brake system for a tractor unit of a tractor-trailer vehicle, which automatically modifies the relative front to rear braking rates on the tractor when operating without a trailer. This system is entirely fluid pressure operated, is relatively unaffected by vehicle vibration and road hazards, and is generally impervious to the adverse environments normally encountered during vehicle operation. The system does not rely on electronic controls for its operation and requires a minimum of maintenance.

In a preferred embodiment, the brake system includes a source of pneumatic pressure, pressure operated brake actuators for engaging front and rear wheel mounted brakes, and conduits for conveying the pneumatic pressure to the actuators. The flow and application of pressure to the actuators is controlled by valving disposed in the brake system flow paths. The valving includes a ratio and proportioning apparatus which responds to a trailer detached condition to modify the flow to the rear brake actuators so that reduced rear braking occurs when operating the tractor without the trailer.

The brake system of the present invention obviates the need for electronic anti-skid controls on the rear tractor brake. The system is responsive to the operating mode of the tractor, specifically responding to the absence of an attached trailer to appropriately reduce the pressure applied to the rear brake actuators, thereby reducing the braking rate of the rear tractor brakes. The ratio and proportioning apparatus includes a control piston and associated biasing which is operative to reduce the pneumatic pressure applied to the rear actuators for a predetermined range of pressures. Once this range of pressures is exceeded, the proportioning affect of the control piston on the pressure flow is gradually reduced. Thus, although the pressure to the rear brake actuator is reduced under normal conditions when operating without a trailer, should a situation arise in which maximum braking is desired, maximum pressure (i.e., source pressure) is available on demand. This feature then allows a vehicle operator to "push through" the proportioning function of this brake system to obtain maximum braking rates when conditions warrant it.

According to a preferred embodiment of the invention, the brake system further includes an operator actuated treadle valve for generating a signal pressure indicative of the degree of brake application desired. This treadle generated signal pressure is communicated to the front and rear relay valves which then control the flow of pneumatic pressure from the source to the front and rear brake actuators respectively, in response to the signal pressure. The signal pressure, communicated to the relay valves, acts upon internal operating members which in turn cause associated movements in valve elements and allow pressure flow through the relay valve from the source to the actuators.

In a preferred embodiment, the proportioning apparatus is a ratio and proportioning valve disposed in a flow path intermediate the treadle valve and the rear tractor relay valve. This ratio and proportioning valve is operative, when enabled, to reduce the treadle generated signal pressure being conveyed to the rear relay valve and hence reduces the pressure applied to the rear brake actuators.

The brake system includes an emergency pressure conduit for communicating pressure from the tractor brake system to a trailer emergency brake sub-system. When a trailer is attached, a predetermined pressure, generally reservoir pressure, will be present in this conduit. When detached, this conduit will be at atmospheric pressure.

The ratio and proportioning valve includes a piston and associated chamber which communicates with the pressure in this conduit. When the predetermined pressure is present in the conduit (when a trailer is attached), the piston is driven into contact with a valve member within the valve, displacing it to a non-proportioned flow position, thus functionally disabling the valve. In other words, when operating with the trailer, the flow of signal pressure from the treadle valve to the rear relay valve is unobstructed and the maximum braking rate for a given treadle depression is provided.

This system configuration provides an inexpensive yet reliable apparatus for automatically reducing the braking rate of the rear tractor brakes when operating without a trailer. This system is entirely pneumatic, requiring only pneumatic signals for its operation, and does not rely on electronic controls.

According to another feature of this invention, the ratio and proportioning valve includes a piston member which is biased by source pressure. This biasing method provides a reservoir sensitive proportioning function to prevent unusually low pressures from being overly proportioned. When the ratio and proportioning valve is enabled, the output of the valve is related to the ratio of the piston areas and the associated biasing. If a fixed biasing were employed, the system would be insensitive to low source pressures precipitated by conduit failure, etc. and would proportion, even pressures that were substantially less than normal, rendering full source pressure unavailable for the rear tractor brakes.

In the preferred brake system, the front relay valve is a dual mode relay valve disclosed in co-pending application, Ser. No. 909,059 filed May 24, 1978 under the title Brake System which is hereby incorporated by reference. The dual mode relay valve communicates with a service conduit conveying a treadle related signal pressure to a trailer service brake sub-system when a trailer is attached. The conduit communicates with the atmosphere when the trailer is not attached. The pressure in this conduit is communicated to a proportioning chamber within the dual mode relay valve and acts upon an internal control piston in opposition to the force applied by the treadle generated signal pressure. The output of the relay valve is then reduced by the pressure in this conduit.

In accordance with this feature, the front relay valve acts as an amplifying relay valve when operating without a trailer because its output is affected by only signal pressure due to the presence of atmospheric pressure in the service conduit and thus greater front braking is obtained for a given treadle depression. The rear brake pressures, on the other hand, are reduced by the ratio and proportioning valve which is enabled whenever a trailer is detached. Because the front brake pressures are amplified, the front brake actuators reach reservoir pressure at a treadle depression that is less than the depression required to raise the rear brake actuators to reservoir pressure. This feature, then provides the driver with the ability to maintain full front braking while reducing or modulating the rear braking by slight movements in the treadle. As long as the treadle is not released beyond the point at which full brake pressures are applied to the front actuators, these movements will only effect the rear braking rate.

When operating with a trailer, the output of the front relay valve is reduced by the pressure in the service conduit, whereas the ratio and proportioning valve, being disabled, allows full treadle signal pressure to be conveyed to the rear relay valve. Thus, the rear braking rate is substantially increased relative to the front resulting in the rear tractor brakes bearing a greater portion of the braking effort when a trailer is attached.

This invention then prevents a novel braking system which automatically adjusts the relative front to rear braking ratios on the tractor unit in response to the presence or absence of an attached trailer. The system does not require electronic controls for its function and does not require operator intervention for its activation.

It is a general object of this invention to provide an improved brake system for a tractor unit of a tractor-trailer vehicle.

It is a further object of this invention to provide a brake system which automatically proportions the front and rear braking ratios on the tractor unit when operating with and without a trailer.

It is another object of this invention to provide a brake system which effectively modifies the rear tractor braking ratios when operating without a trailer.

Additional features and advantages of this invention will be found in reading the following detailed description made with reference to the accompanying drawings.

DESCRIPTION OF THE PREFERRED EMBODIMENT

Figure 1:
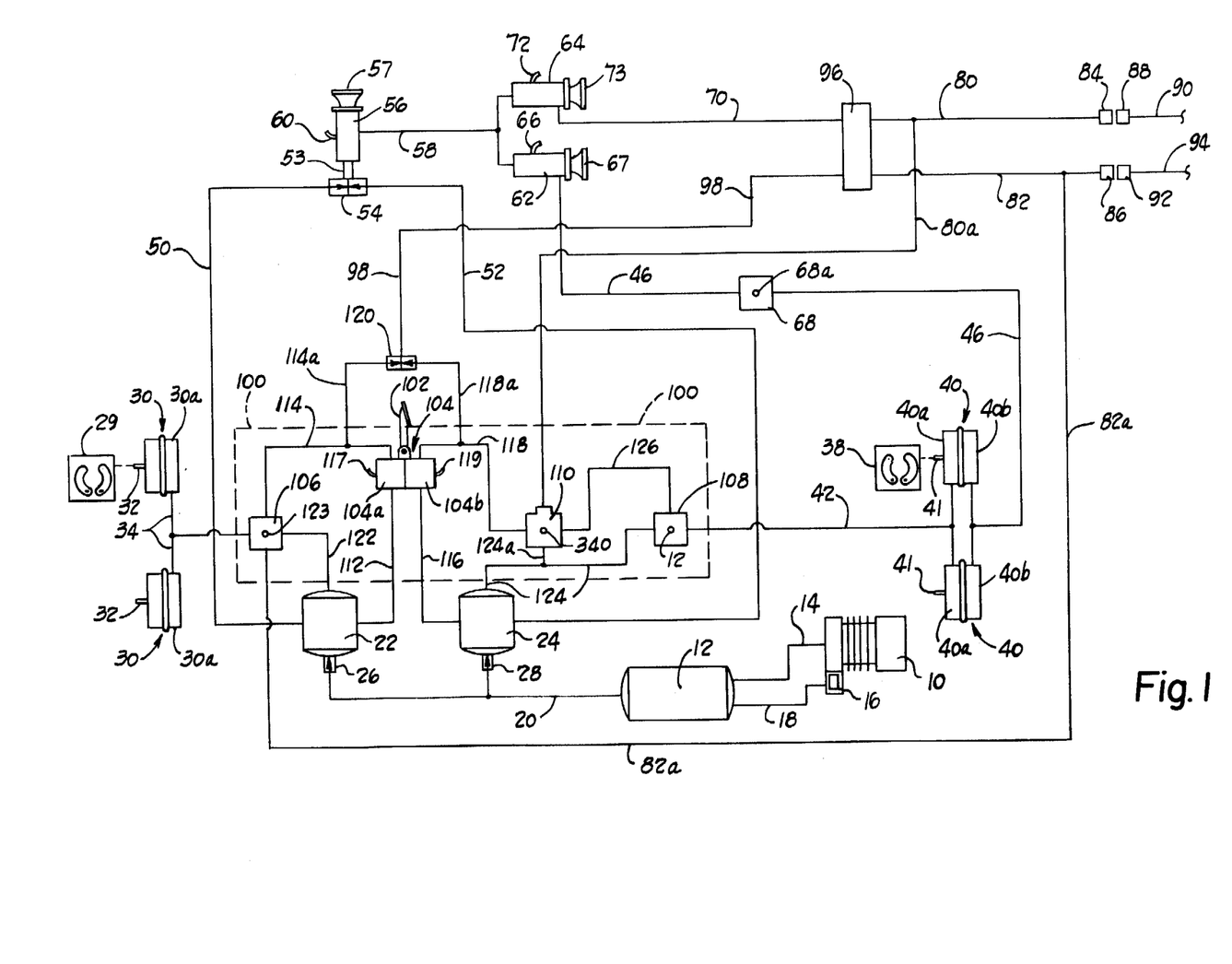
FIG. 1 is a schematic view of a tractor brake system embodying the present invention.

FIG. 1 illustrates a braking system for a tractor unit of a tractor-trailer vehicle constructed according to a preferred embodiment of the invention. The brake system is pneumatically operated, utilizing an engine driven air compressor 10 for the source of pressurized air. The output of the compressor is conveyed to a primary reservoir 12 by a supply conduit 14. Once a predetermined pressure is reached, a governor 16 communicating with the primary reservoir through a return conduit 18, is operative to prevent a further pressure increase in the reservoir 12.

A reservoir supply conduit 20 communicates the pressure in the primary reservoir to a pair of secondary reservoirs 22, 24, through check valves 26, 28. The check valves 26, 28 allow fluid pressure flow into the reservoirs 22, 24, but prevent the flow of pressurized air from the reservoirs into the supply conduit 20.

Front wheel brakes shown schematically as 29 are engaged by conventional pneumatically operated brake actuators 30. Each actuator 30 includes a pressure chamber 30a and an extensible push rod 32. Pressure is conveyed to the pressure chamber, during braking, by a brake actuator supply conduit 34, which when pressurized causes the push rod 32 to extend and apply the vehicle brakes 29. When the pressure in the supply conduit 34 is exhausted, a return spring (not shown) within the brake actuator 30 causes a retraction of the push rod 32 and attendant brake release.

Rear tractor brakes shown schematically as 38 are actuated by conventional pneumatically operated brake actuators 40 having adjacent service brake and emergency brake pressure chambers 40a, 40b. Like the front brake actuators 30, the actuators 40 include an extensible push rod 41 which extends whenever the service brake chamber 40a is pressurized. A brake actuator supply conduit 42 communicates pressure to the service brake chamber 40a during vehicle braking. When the pressure is exhausted in the conduit 42, the push rod 41 retracts to release the brakes.

The emergency brake chamber 40b includes a spring (not shown) which urges the push rod 41 towards a brake applied position. Under normal operating conditions, pressure is communicated via emergency conduit 46 to the chamber 40b to oppose the spring force and maintain the push rod 41 in a released position. The emergency application of the rear tractor brakes occurs whenever the pressure in the emergency conduit 46 falls below a predetermined level.

Pressurized air is supplied to the emergency conduit 46 by the secondary reservoirs 22, 24. A pair of reservoir supply conduits 50, 52 communicating with respective reservoirs 22, 24, convey pressurized air to a supply conduit 53 through a double check valve 54. The double check valve 54 is operative to allow the higher pressurized one of the conduits 50, 52 to communicate with the supply conduit 53. A manual control valve 56 controls the flow of pressurized air from the supply conduit 53 to an emergency supply conduit 58. When a knob 57 of the valve 56 is depressed, it communicates the supply conduit 53 with the emergency supply conduit 58. When it is pulled, or "popped" outward, the emergency supply conduit 58 is communicated to a vent 60, which then exhausts any pressure in the conduit 58 to the atmosphere.

A pair of manual control valves 62, 64 controls the flow and distribution of the emergency supply pressure to the rear actuators and to a trailer brake system when a trailer is attached. The valve 62 selectively communicates the tractor emergency supply conduit 46 with either the emergency supply conduit 58 or a vent 66. When a control knob 67 of the valve 62 is depressed, the tractor emergency conduit 46 communicates with the emergency conduit 58. When the knob 67 is pulled outward, the conduit 46 communicates with the vent 66 and any pressure in the conduit 46 is exhausted to the atmosphere. The tractor emergency brake apparatus also includes a quick release valve 68 which is disposed in the conduit 46 intermediate the valve 62 and the emergency brake chambers 40b. When the pressure in the emergency conduit 46 falls below a predetermined level, the quick release valve 68 communicates the conduit 46 to a vent 68a, immediately exhausting the remaining pressure in the conduit 46 to the atmosphere.

The valve 64 selectively communicates a tractor carried, trailer supply conduit 70 with either the emergency supply conduit 58 or a vent 72. When a control knob 73 of the valve 64 is depressed, the supply conduit 70 communicates with the emergency supply conduit 58. When the knob 73 is pulled outward, the supply conduit 70 communicates with the vent 72 and any pressure in the conduit 70 is vented to the atmosphere.

A pair of conduits 80, 82, terminating in respective quick disconnects 84, 86, convey pneumatic pressure from the tractor brake system to a trailer carried brake system when a trailer is attached to the tractor. The quick disconnect 84 is coupled to a companion trailer disconnect 88 to communicate emergency brake pressure from the conduit 80 to a trailer conduit, a portion of which is indicated by the reference character 90. The connector 86 is coupled to a companion trailer connector 92 to communicate a brake signal pressure in the conduit 82 to a trailer carried conduit, a portion of which is indicated by the reference character 94. When a trailer is not attached to the tractor, the connectors 85, 86 communicate the conduits 80, 82 to the atmosphere.

The communication of air pressure to the conduits 80, 82 is controlled through a conventional tractor protection valve 96. When a trailer is attached, the tractor protection valve 96 is operative to communicate the trailer emergency supply conduit 70 with the conduit 80 and a trailer brake signal conduit 98 with the conduit 82. The tractor protection valve 96, depends for its operation, on a predetermined pressure in the conduit 70. Absent this pressure, the tractor protection valve seals off communication between the conduits 98, 82.

Valving, delineated by the dashed line 100, controls the flow of pressurized air from the secondary reservoirs 22, 24 to the pressure chambers 30a, 40a of the front and rear brake actuators 30, 40, respectively, as a function of movement in an operator actuated treadle 102. The valving additionally controls the flow of a treadle related signal pressure to the trailer brake signal conduit 98.

According to a preferred embodiment of the invention, the valving includes a treadle valve 104, a front relay valve 106, a rear relay valve 108, and a ratio and proportioning valve 110. The treadle valve 104 includes a pair of control valves 104a, 104b concurrently operated by the treadle 102. The control valve 104a controls the flow of pressurized air from a reservoir conduit 112 to a signal conduit 114 and, similarly, the control valve 104b controls the flow of pressurized air from a reservoir conduit 116 to a signal conduit 118, the delivered pressure from both valves being in proportion to the amount of treadle depression. When the treadle 102 is released, the pressure in the signal conduits 114, 118 is exhausted through vents 117, 119 respectively.

A pair of branch signal conduits 114a, 118a communicate signal pressure to the trailer brake signal conduit 98 through a double check valve 120. The double check valve 120 is operative to permit the higher pressurized one of the conduits 114a, 118a to communicate with the conduit 98.

The relay valves 106, 108 control the flow of reservoir pressure to their associated service brake actuators. Specifically, the front relay valve 106 communicates with the signal conduit 114 and a reservoir supply conduit 122 and controls the flow of pressurized air from the reservoir 22 to the front brake actuator supply conduit 34. The pressure delivered to the conduit 34 by the relay valve 106 is a function of the signal pressure introduced into the valve by conduit 114. When the signal pressure in the signal conduit 114 is exhausted (upon treadle release), the valve 106 exhausts the pressure in the supply conduit through a vent 123.

In the preferred brake system, the front relay valve 106 is a dual mode relay valve which is disclosed and claimed in the referenced copending application. In addition to communicating with the conduits 34, 114, and 122, the dual mode relay valve communicates with a pressure feedback conduit 82a. The feedback conduit 82a conveys a "proportioning" pressure to the valve 106 whenever a trailer is attached to the tractor. This proportioning pressure, when supplied to the valve 106 proportionately reduces the output of the dual mode relay valve for a given signal pressure. When the trailer is not attached to the tractor, the conduit 82, and hence 82a, is at atmospheric pressure and the output of the dual mode relay valve is not reduced.

Figure 2:
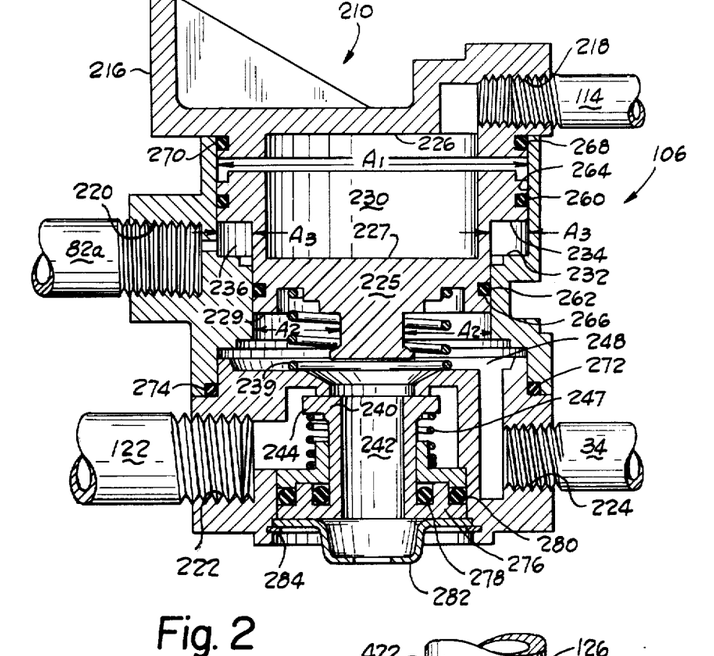
FIG. 2 is a cross sectional view of a dual mode relay valve used in the preferred brake system of FIG. 1, the valve components being in the position they assume in the absence of input pressures.

The construction of the dual mode relay valve 106 is shown in FIG. 2. The valve 106, includes three sub-assemblies in the forms of a cover 210, an upper housing 212 and a lower housing 214 which also acts as a bottom cover. The top cover 210 includes a mounting flange 216 and a threaded signal pressure input port 218. The upper housing 212 includes a threaded proportioning pressure input port 220. The lower housing 214 includes a threaded reservoir supply port 222 and a threaded delivery pressure port 224. The three valve sub-assemblies 210, 212, and 214 are secured together by means of threaded fasteners (not shown).

Disposed within the bore of the upper housing 212 is an annular control piston 225. A bottom surface 226 of the cover 210 and a top surface 227 of the control piston 225 define a signal pressure chamber 230. A top surface 232 of an annular shoulder 233 formed in the upper housing and a lower surface 234 of the control piston 225 define a proportioning pressure chamber 236 communicating with the brake proportioning port 220. The control piston 225 further includes a downward extending portion 238. A relatively light spring 239, surrounds the downward portion 238 and urges the control piston 225 upward and assures that the piston 225 returns to its uppermost position when signal pressure is removed from the chamber 230.

Disposed within the lower housing and axially aligned with the control piston 225 is an inlet valve 240. Disposed within the inlet valve 240 is a bore 242 which acts as an exhaust passage and communicates with the atmosphere. An annular flange 244 is formed in the top of the inlet valve 240 and is biased into abutting engagement with annular housing portion 246 by an inlet valve return spring 247. The delivery port 224 communicates with a delivery pressure chamber 248. When the flange 244 of the inlet valve 240 abuts the annular housing portion 246, the flow of pressurized fluid from the reservoir port 222 into the chamber 248 is prevented.

Resilient seals 260, 262 are carried by annular grooves 264, 266, respectively in the control piston 225. These seals allow the control piston to slide axially within the bore but prevent fluid communication between the various pressure chambers. Specifically, the seal 260 prevents fluid communication between the signal pressure chamber 230 and the proportioning pressure chamber 236. The seal 262 prevents fluid communication between the proportioning pressure chamber 236 and the delivery pressure chamber 248.

An annular groove 268 in top cover 210 carries a resilient gasket 270 which seals the interface between the top cover 210 and the upper housing 212. Similarly, an annular groove 272 in the upper housing 212 carries a resilient gasket 274 and seals the interface between the upper housing 212 and the lower housing 214.

A valve seat insert shown generally as 276 carries two resilient seals 278 and 280. The seal 280 seals the interface between the insert 276 and the lower housing 214. The seal 278 allows the inlet valve 240 to slide axially within the seat insert 276 and concurrently seals the periphery of the inlet valve. A cap 282 defining the vent aperture 123 is secured by snap ring 284 and retains the valve seat insert within the lower housing 214.

In operation, a signal pressure generated by the treadle valve 102 enters the chamber 230 through the signal port 218. The pressure in the chamber 230, acting on area A, of the surface 227 of the control piston 225, urges the piston downward. Prior to control piston movement, the delivery port 224 and delivery pressure chamber 248 communicate with the atmosphere through the exhaust passage 242 in the inlet valve 240. As the control piston 225 moves downward, the downward extending portion 238 contacts the top flange 244 of the inlet valve 240 and seals the chamber 248 from the atmosphere. Further downward movement causes the inlet valve 240 to open allowing pressure from the reservoir port 222 to enter the delivery chamber 248 and exit through the delivery port 244.

The pressure in the delivery chamber 248 acts on the area $A_2$ of the lower control piston surface 229 in opposition to the force being applied by the pressure in the signal chamber 230 acting on area $A_1$. It must be remembered that the force applied to a given surface on the control piston 225 is the product of the area of the surface and the pressure to which it is exposed. Once the force being applied to the lower surface 229 of the control piston exceeds that being applied to the surface 227 of the control piston, the piston will move upward allowing the inlet valve 240 to close, interrupting the flow of reservoir pressure to the delivery port 224. It should be apparent that the amount of pressure that will be allowed to flow to the delivery port before control piston 225 is forced upward, will depend on the signal pressure introduced into the signal chamber 230. Absent pressure in the proportioning pressure chamber 236, the delivery port pressure for a given signal pressure will be the product of the signal pressure and the ratio of $A_1$ to $A_2$, or expressed mathematically: (excluding valve hysterisis)

Delivery Pressure = (Signal Pressure) $\times A_1/A_2$

When the signal pressure is removed, the piston 225 will rise to its uppermost position and vent the delivery pressure chamber 248 to the atmosphere through the exhaust passage 242.

The operational explanation has thus far excluded the chamber 236. It should be apparent that pressure entering the port 220 and acting on area $A_3$ of the lower surface 234 of the control piston will tend to urge the control piston upward. It will thus be seen that by introducing pressure into the chamber 236, less pressure need enter the delivery chamber 248 to effect the upward movement of the control piston. Or conversely, more signal pressure must enter the chamber 230 to effect downward movement of the control piston to offset the pressure being applied to the area $A_3$ of the control piston.

To arrive at the relationship between delivery port pressure, proportioning pressure, and signal pressure, it must be remembered that the control piston 225 will interrupt pressure flow to the delivery port when the forces tending to urge the control piston downward equal those forces tending to urge the control piston upward. The delivery pressure and the proportioning pressure acting on the respective areas, $A_2$ and $A_3$, of the control piston 225 urge the piston upward, whereas the signal pressure acting on the area $A_1$, urges the piston downward. Accordingly:

Delivery Pressure $\times A_2$ + (Proportioning Pressure) $\times A_3$ = Signal Pressure $\times A_1$ This equation can now be solved for delivery pressure; the following mathematical relationship results: (excluding valve hysterisis)

Delivery Pressure = (Signal Pressure) $\times A_1/A_2$ − (Proportioning Pressure) $\times A_3/A_2$ It should now be apparent that the delivery pressure of the dual mode relay valve 106 will be reduced whenever pressure is introduced into the proportioning pressure chamber 236. The reduction will be equal to the product of the proportioning pressure applied and the ratio of $A_3$ to $A_2$.

The rear relay valve 108 is of conventional construction and communicates with a reservoir supply conduit 124 and a signal conduit 126. The valve 108 delivers a pressure to the actuator supply conduit 42 in proportion to the signal pressure introduced by the signal conduit 126. When the pressure in the signal conduit 126 is exhausted, the valve 108 exhausts the pressure in the supply conduit 42 through a vent 127.

The ratio and proportioning valve 110 controls the flow of pressurized air from the signal conduit 118 to the signal conduit 126. The valve 110 includes a disabling feature which disables the proportioning or ratio function under certain vehicle conditions to allow unrestricted pressure flow through the valve, from the conduit 118 to the conduit 126. In the preferred valve, the disabling feature depends for its operation on a communication with the trailer emergency supply conduit 80 via branch feedback conduit 80a. When the conduit 80a is pressurized (when a trailer is attached), the pressure applied to the valve 110 operates the valve disabling mechanism and allows the signal conduit 126 to communicate unrestrictedly with the conduit 118. When atmospheric pressure is present in conduit 80a (when a trailer is not attached to the tractor), the valve 110 proportionately reduces or ratios the signal pressure flowing from the signal conduit 118 to the signal conduit 126 and under these conditions, the output of the rear relay valve 108 is proportionately reduced, thus reducing the braking rate of the rear tractor brakes 38.

The preferred ratio and proportioning valve 110, communicates with the pressure in the reservoir 24 through a branch supply conduit 124a, to provide a reservoir pressure sensitive proportioning function. Should the reservoir pressure drop, the valve 110 adjusts its proportioning function accordingly and prevents the signal pressure from being overly proportioned so that gross vehicle underbraking is avoided or minimized.

The operation of the overall brake system is as follows. When the tractor engine (not shown) is started, the air compressor 10 begins pressurizing the primary reservoir 12 through conduit 14 and the secondary reservoirs 22, 24, through conduit 20. Once the reservoirs 22, 24 are pressurized, the knob 57 of the valve 56 is depressed to communicate the reservoir pressures to the emergency supply conduit 58. At this stage, the front brakes 29 are engageable in response to depression of the treadle 102. The depression of the treadle 102 will initiate a flow of signal pressure from the conduit 112 to the conduit 114 which in turn, will be applied to the relay valve 106 to effect a proportional flow of pressurized air from the reservoir 22 to the brake actuator service chambers 30a. The rear brakes 38 are still engaged due to the absence of pressure in the emergency brake chamber 40b.

Depression of the control knob 67 of the valve 62 will communicate the emergency supply conduit 58 with the tractor emergency brake conduit 46. As the conduit pressurizes, the quick release valve 68 will seal off communication between the vent 68a and the conduit 46 resulting in the pressurization of the emergency brake chambers 40b. Once the chambers 40b are pressurized, the rear brakes 38 are fully operational and are engageable in response to movement in the treadle 102. Depression of the treadle 102, will initiate a flow of signal pressure from the conduit 116 to the signal conduit 118. The signal pressure will travel through the ratio and proportioning valve 110 to the signal conduit 126. The amount of signal pressure transmitted through the valve 110 will depend on the operational mode of the tractor. The signal pressure in conduit 126, applied to the rear relay valve 108, will cause a proportional flow of pressurized air from the reservoir 24 to the brake actuator supply conduit 42 and will effect brake engagement.

At this stage of operation, the tractor brake system is fully operational. If a trailer is attached to the tractor, the connectors 84, 86 are coupled to the trailer connectors 88, 92 to communicate the trailer carried conduits 90, 94 to the tractor brake system conduits 80, 82. The pressurization of the conduit 80, which supplies pressure to the trailer brake system and controls the application of the trailer emergency brakes, is accomplished through the tractor protection valve 96. To pressurize conduit 80, the control knob 73 of the valve 72 is depressed to communicate the emergency supply conduit 58 with the supply conduit 70. Once the conduit 70 reaches a predetermined pressure, the tractor protection valve 96 will operate to communicate the signal conduit 98 with the tractor carried, trailer signal conduit 82. As was noted earlier, the signal conduit 98 conveys a treadle related signal pressure to the trailer to effect trailer brake application.

The pressures in the conduits 80, 82 are conveyed by the branch conduits 80a and 82a to the ratio and proportioning valve 110 and the dual mode relay valve 106, respectively. The trailer emergency supply pressure conveyed to the ratio and proportioning valve 110 functionally disables the valve and allows signal pressure to flow unimpeded from signal conduit 118 to the signal conduit 126. The trailer brake signal pressure in the conduit 82, which is generated by treadle depression, is communicated to the brake proportioning chamber 236 (shown in FIG. 2) in the dual mode relay valve 106 via the branch conduit 82a. As was described earlier, the pressure supplied to the brake proportioning chamber applies a force to the control piston 225, within the relay valve, which opposes the force applied by the signal pressure and results in a reduced relay valve output for a given signal pressure. Thus, when a trailer is attached to a tractor, increased braking of the rear tractor brakes is obtained due to the disablement of the ratio and proportioning valve 110 and reduced braking of the front brakes is obtained due to the feedback pressure supplied to the brake proportioning port of the dual mode relay valve 106, for a given signal pressure.

If a trailer is not attached to the tractor, the knob 73 of the valve 64 is left in its outward or popped position and communicates the supply conduit 70 with the vent 72. The conduits 80, 82 and hence the branch conduits 80a, 82a communicate with the atmosphere through the uncoupled connectors 84, 86. Because the branch conduit 82a is at atmospheric pressure, the output of the dual mode relay valve 106 is not reduced (no pressure is supplied to the brake proportioning chamber) and a given signal pressure in conduit 114 effects a greater output of the relay valve 106 when a trailer is unattached. Thus, a maximum front braking rate is obtained for a given treadle depression.

In the preferred construction of the dual mode relay valve 106, the output pressure will be amplified with respect to the signal pressure applied, when a trailer is not attached. In other words, the output pressure of the relay valve 106 will be greater than the signal pressure applied, for a given treadle depression.

The communication of atmospheric pressure to the ratio and proportioning valve 110 functionally enables the valve. In this mode of operation, the signal pressure conveyed to the signal conduit 126 is reduced or ratioed by the valve 110. The reduced signal pressure applied to the rear relay valve 108 results in a reduced braking of the rear tractor brakes for a given depression of the treadle 102. The combination of the amplified front braking rate and the decreased rear braking rate, for a given treadle depression, results in the front brakes bearing a much greater share of the tractor braking when the tractor is operated "bobtail".

Moreover, this feature allows the vehicle operator to vary or modulate the braking rate on the rear tractor brakes while maintaining full braking on the front brakes. This operational feature can be accomplished due to the amplifying function of the front relay valve. Because the front relay valve amplifies the output pressure for a given treadle depression, the front brake actuators will reach reservoir pressure at a treadle depression that is less than that required to raise the rear brake actuators to reservoir pressure. Once the front brake actuators reach reservoir pressure, further treadle depression only effects the pressure applied to the rear brake actuators. Thus, a range of treadle movement beyond the point at which reservoir pressure is applied to the front brake actuators, can be used to vary or modulate the rear tractor brakes to maximize overall braking effectiveness.

Figures 3, 4:
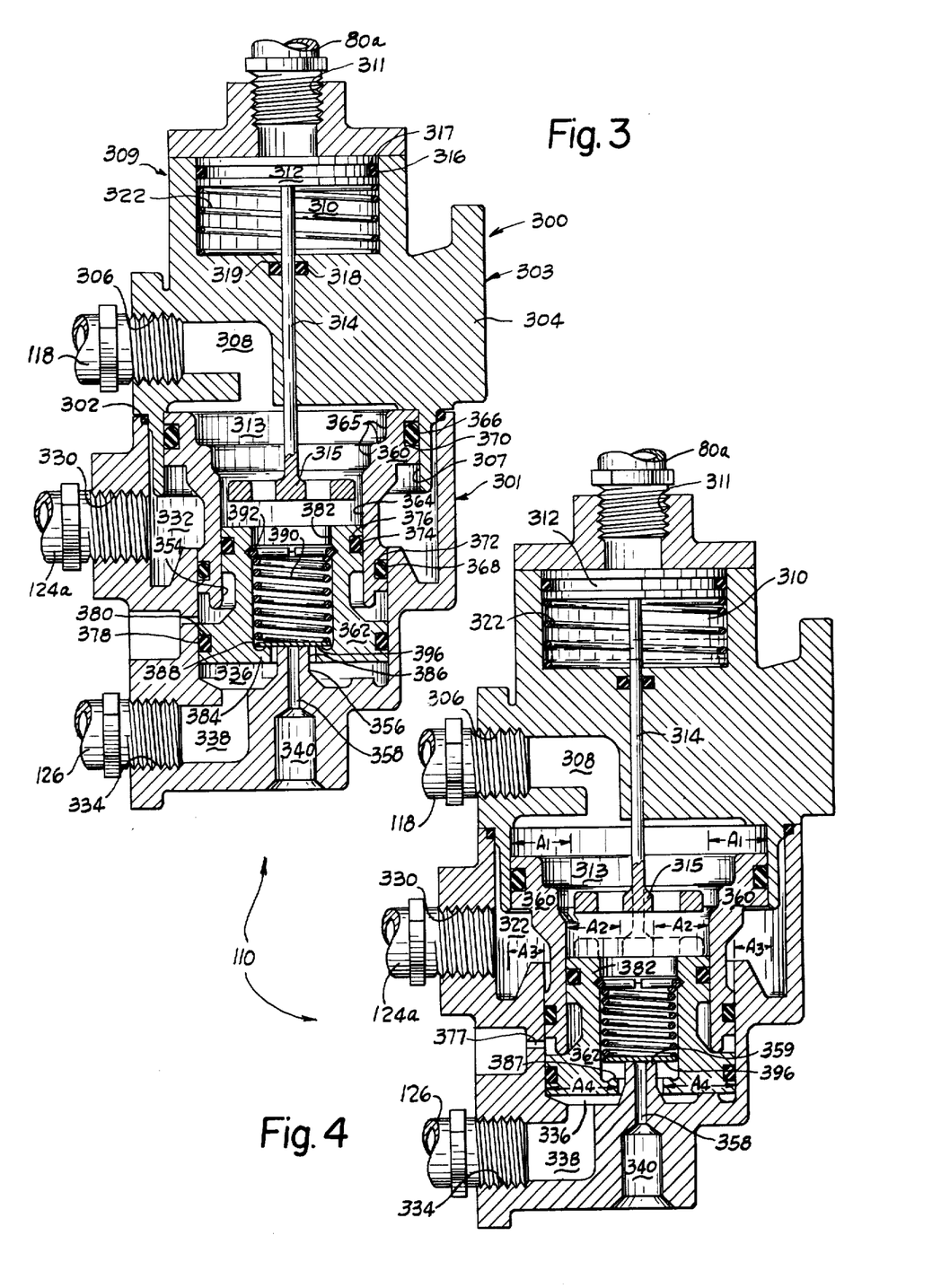
FIG. 3 is an enlarged cross sectional view of a preferred embodiment of a ratio and proportioning valve used in the system of FIG. 1, the valve components being shown in the position they assume under one set of pressure conditions.
FIG. 4 is an enlarged cross sectional view of the same valve shown in FIG. 3, the valve components being shown in the position they assume under another set of pressure conditions.

FIGS. 3 and 4 illustrate a ratio and proportioning valve 110 constructed in accordance with a preferred embodiment of the invention. The valve 110 comprises a cover assembly 300 and a valve body 301 secured together by threaded fasteners (not shown) and sealed by an O-ring 302.

A lower or cover portion 303 of the cover assembly 300 includes a mounting flange 304 (for mounting the valve to the vehicle), a threaded input signal pressure port 306, and a bore 307 which communicates with the input signal pressure port 306 through an L-shaped passage 308.

An upper portion 309 of the cover assembly 300 houses a valve disabling mechanism. It includes a disabling pressure chamber 310 which communicates with a disabling pressure port 311 and an actuating piston 312 disposed within the pressure chamber 310. An actuating rod 214 is attached to the piston 312 and extends downwardly through the cover portion 303 into an input chamber 313 partially defined by the bore 307. An apertured actuating shoe 315 is attached to the opposite end of the piston rod 314. An O-ring 316 carried by an annular groove 317 in the piston and an O-ring 318 supported in a housing groove 319 allow axial movement in the piston/piston rod assembly but prevent air leakage out of or into the chambers 310, 313. A relatively light spring 322 biases the piston assembly upwardly.

The valve body 301 includes a threaded reservoir port 330 communicating with a reservoir pressure chamber 332, a threaded delivery port 334 communicating with a delivery pressure chamber 336 through an L-shaped flow passage 338, and an exhaust port 340. The valve body 301 additionally includes a bore 354 and a cylindrical structural projection 356 located coaxially with the bore 354 and having a concentrically disposed exhaust passage 358 communicating with the exhaust port 340. The top surface 359 of the projection 356 forms an exhaust valve seat.

An upper control piston 360 and a lower control piston assembly 362 are disposed within the assembled valve 110. The control piston 360 includes a bore 364 which telescopically receives a portion of the second control piston 362. The inner surface of the bore 364 and the internal annular surface 365, above the bore 364 together with the inner surface of the cover bore 307 define the input chamber 313. The upper portion of the piston 360 is slidably supported by the cover bore 307 and the lower portion is slidably supported by the valve body bore 354. O-ring seals 366, 368 carried by piston grooves 370, 372 sealably engage the walls of the respective bores 307, 354.

The control piston assembly 362 is slidably supported by both the control piston 360 and the valve body bore 354. The upper portion which carries a peripheral O-ring 374 in a respective groove 376 sealably engages the internal control piston bore 364. A vent 377 exhausts any pressure established between the pistons 360, 362 due to seal leakage, etc. The lower portion of control piston 362 sealably engages the valve body bore 354 by means of an O-ring 378 carried in a piston groove 380. The piston 362 further includes a concentric bore 382 terminating in a radially extending step portion 384. The step portion defines a centrally disposed aperture 386, axially aligned with the annular projecting portion 356. The diameter of the aperture is larger than that of the projection so that as the control piston 362 moves downwardly, the projection will enter the aperture with suitable clearance. The top surface 387 of the step portion 384 forms an inlet valve seat.

An inlet/exhaust valve 388 and an associated biasing spring 390 are disposed within the piston bore 282 and are secured there by a snap ring 392. A lower surface 396 of the inlet/exhaust valve 388 is adapted to sealably engage the projection surface 359 and/or the inlet valve seat surface 387 to seal off communication between the chamber 336 and the exhaust passage 358, and the communication between the chamber 313 and the delivery pressure chamber 336. When the surfaces 359 and 387 are flush, the delivery chamber 336 is concurrently sealed from both the exhaust passage 358 and the chamber 313.

FIG. 3 depicts the positions assumed by the valve elements in the absence of pressure in the disabling pressure chamber 310 and the signal input chamber 313. Under these pressure conditions, the lower surface 396 of the inlet/exhaust valve 388 abuts the top surface 387 or inlet valve seat of the step portion 384 and prevents communication between the input chamber 313 and the delivery pressure chamber 336.

Referring to FIGS. 1, 2, 3 and 4, the functional description of the ratio and proportioning valve 110 is as follows. The depression of the treadle 102 will initiate a proportionate flow of signal pressure into the signal conduit 118 which will be conveyed to the input signal port 306 and then introduced via passage 308, to the input chamber 313. The signal pressure entering the input chamber 313 will act on the annular effective pressure area A1 of the control piston 360 and the annular effective pressure area A2 of the control piston assembly 362 and will establish a force on the pistons 360, 362 urging them downwardly.

Whether the pistons 360, 362 move in concert or relative to each other will be determined by the magnitude of the signal pressure applied to the input chamber 313. The control piston 360 is biased upwardly by the pressure in the reservoir pressure chamber 332 acting on an effective pressure area A3. In order to effect movement in the upper control piston 360, the signal pressure acting on area A1 of the control piston 360 must be greater than a "transition pressure", $P_t$, so that a force is established which exceeds the force applied by the reservoir pressure acting on area A3. For signal pressure less than the "transition pressure", $P_t$, only the lower piston 362 will move in response to the signal pressure in the input chamber 313.

For signal pressure values less than $P_t$, the ratio and proportioning valve 110 will display the following mode of operation. The signal pressure entering chamber 313 will urge the control piston assembly 362 downwardly. The initial downward movement of the piston 362 will cause the lower surface 396 of the inlet/exhaust valve 388 to abut the exhaust valve seat (the projection surface 359) and seal off the exhaust passage 358. Further downward movement of the piston 362 will disengage the inlet valve seat 387 from the lower surface 396 of the inlet/exhaust valve 388 and allow pressurized air to flow from the chamber 313 into the delivery pressure chamber 336. The pressure delivered to the chamber 336 will act upon a counter effective pressure area A4 defined by a lower surface 398 of the piston 362 and will apply a force opposing the force applied to the area A2 by the signal pressure. Once the force applied to the area A4 exceeds that applied to the area A2, the piston 362 will rise until the lower surface 396 of the inlet/exhaust valve 388 abuts the inlet valve seat 387 and seals off the communication between the input chamber 313 and the delivery pressure chamber 336. Because the area A4 is larger than the area A2, the communication between the chamber 313 and the chamber 336 will terminate before the full signal pressure is developed in chamber 336. For this range of signal pressures (signal pressures less than $P_t$), the ratio and proportioning valve 110 will reduce the amount of signal pressure conveyed from the signal conduit 118 to the signal conduit 126 in an amount determined by the ratio of the areas A2 and A4.

Signal pressures greater than the "transition pressure", $P_t$, will displace both control pistons 360, 362 as shown in FIG. 3. Essentially, for pressures greater than $P_t$, the pistons 360, 362 will move as one piston having an effective pressure area equal to the sum of the areas A1 and A2. The force applied by the signal pressure to the areas is opposed by the pressure in the delivery chamber 336 acting on the area A4 and the fixed force applied by the reservoir pressure acting on area A3.

Because of this change in area geometry and force application, the difference between the signal pressure applied to the chamber 313 and the pressure delivered to chamber 336 will gradually diminish until full signal pressure is conveyed to the delivery chamber 336. Put in other terms, the delivery pressure will gradually "catch up" with the signal pressure as pressures greater than $P_t$ are applied to the chamber 313.

Referring to FIG. 3, the proportioning function of the valve 110 is totally disabled whenever a predetermined pressure is applied to the chamber 310. As was explained earlier, the attachment of a trailer to the tractor and the attendant conduit couplings causes the pressurization of the conduit 80. This pressure, conveyed to the disabling chamber 310 via branch conduit 80a, displaces the piston, piston rod, actuation show 312, 314, 315 to the phantom position shown in FIG. 3. This piston movement will displace the control piston assembly 362 downwardly establishing an unrestricted communication between the input port 306 and the output port 334 regardless of the applied signal pressure. This communication will be maintained until the trailer is disconnected and the pressure in conduit 80a is exhausted. Note however, the upper control piston 36 would not be driven to the downward position shown in FIG. 3, by the action of the disabling piston assembly. Only a signal pressure in excess of the transition pressure can cause movement in the piston 360.

The construction and features of this ratio and proportioning valve offer significant operational advantages. When in the proportioning or ratio mode (when the trailer is detached), the valve 110 will reduce the signal pressure supplied to the conduit 126 by the conduit 118 in a predetermined ratio until the signal pressure exceeds the transition pressure $P_t$. For signal pressures greater than $P_t$, the amount of signal pressure reduction will gradually decrease so that maximum treadle depression (which will generate a signal pressure substantially greater than $P_t$), will over-ride the ratio and proportioning function of the control pistons 360, 362 and full signal pressure will be delivered to the relay valve 108. This feature insures that, should the situation warrant it, full non-proportioned braking of the rear tractor brakes is available regardless of the operating mode of the tractor. This is accomplished without an abrupt change in the braking rate.

Another significant feature of the valve 110, is the biasing of the control piston 360 by reservoir pressure. This biasing method, provides a reservoir pressure sensitive proportioning function. Because $P_t$ is determined by the reservoir pressure acting on the area A3 of the control piston 360, as the reservoir pressure falls, so will $P_t$. If a fixed biasing element, e.g. spring, were employed to bias the control piston 360, the transition pressure $P_t$ would remain fixed and should the reservoir pressure fall, the valve 110 would continue to proportion the signal pressures at the same rate. The fixed $P_t$ would render full reservoir pressure unavailable to the rear brake actuators if the reservoir pressure was abnormally low, resulting in vehicle under braking.

Figure 5:
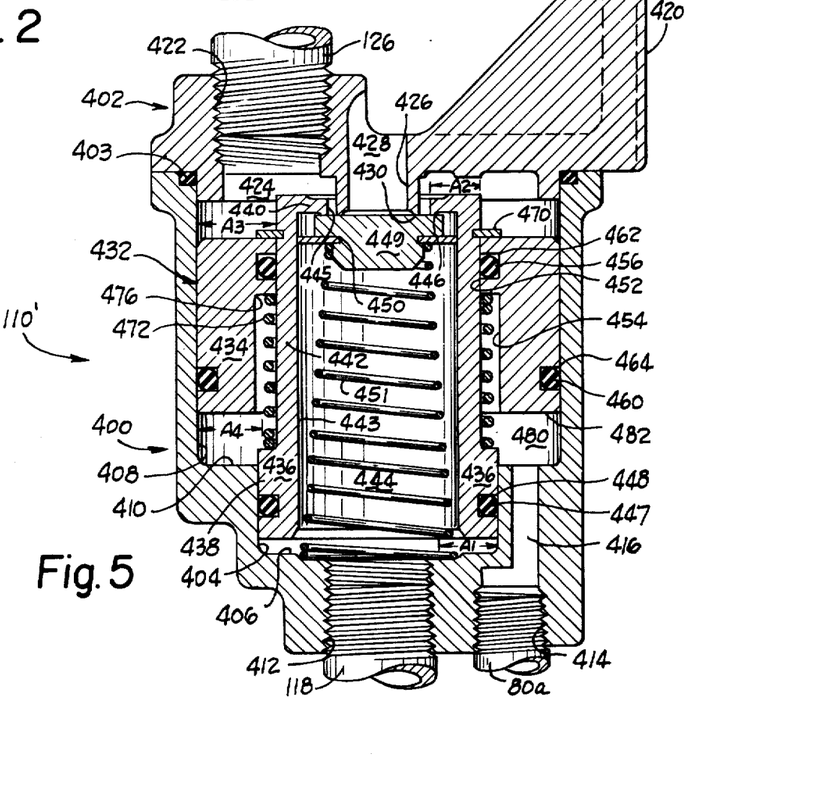
FIG. 5 is an enlarged cross sectional view of an alternate embodiment of the ratio and proportioning valve, the valve components being shown in the position they assume in the absence of input pressures.

FIG. 5 illustrates an alternate ratio and proportioning valve 110', which functions substantially like the preferred valve 110 with the following exception. Unlike the preferred valve, the alternate valve 110' employs a spring instead of utilizing reservoir pressure to bias the control piston and therefore the proportioning function of the alternate valve does not vary in accordance with variations in reservoir pressure. A second distinguishing feature of this valve is the mechanical simplicity of the disabling mechanism.

The alternate ratio and proportioning valve 110' includes a lower housing 400 and an upper housing 402 secured and sealed together by threaded fasteners (not shown) and an O-ring 403. The lower housing 400 includes a bore 404 terminating at an end wall 406 and a counterbore 408 extending from a step 410 to the lower surface of the upper housing 402. A threaded signal pressure input port 412 extends through the end wall 406 and is axially aligned with and opens into the bore 404. A threaded disabling pressure port 414 is spaced from and parallel to the port 412 and communicates with the counterbore 408 through a passage 416.

The upper housing 402 forms a top cover for the valve 110' and includes a mounting flange 420 (for mounting the valve to the tractor), a threaded signal pressure output port 422 and a delivery pressure chamber 424 communicating with the port 422. An annular projection 426 depends centrally from the cover 402, extending into and in axial alignment with the bore 408. The projection 426 includes a concentrically located exhaust passage 428 and a radial end surface 430 which forms an exhaust valve seat.

A control piston assembly shown generally as 432 is disposed within the bores 410, 412 and controls the fluid communication between the signal pressure input port 412 and the signal pressure output port 422. The control piston assembly 432 comprises an outer piston 434 and an inner piston 436, a portion of which is telescopically received in the outer piston 434.

The inner piston 436 is a tubular shaped structure having a shoulder 438 disposed at one end and a stepped portion defined by an inwardly projecting radial portion 440 at the opposite end, the two portions being joined by a uniform cylindrical section 442. A bore 443 partially defining an input chamber 444 extends through the inner piston 436 and terminates at the stepped portion 440. The stepped portion 440 defines an outlet 445 in axial alignment with the bore 443, which communicates the bore 443 with the delivery pressure chamber 424 and also defines a surface 446 which forms an inlet valve seat. An O-ring 447 carried in a piston groove 448, sealably engages the innersurface of the bore 404.

An inlet/exhaust valve 449 is disposed within the bore 443 and is maintained in axial alignment therewith by a grooved washer 450. A spring 451 urges the inlet/exhaust valve 449 towards abutting engagement with the exhaust valve seat 430 and the inlet valve seat 446.

The outer piston 434 is annular in shape and includes a through bore 452 and a counterbore 454. A pair of O-rings 456, 460 carried in respective piston grooves 462, 464 sealably engage the outer surface of the inner piston 436 and the inner surface of the counterbore 408, respectively. The axial movement of the control piston 434 relative to the inner piston 436 is constrained between the counterbore step 410 and a snap ring 470 secured to the inner piston.

A spring 472 surrounds the uniform cylindrical section of the inner piston 436 and is compressively captured between a shoulder 476 of the outer piston bore 454 and the shoulder 438 of the inner piston. The spring exerts a force urging the control pistons 434, 436 in opposing directions, their separation being prevented by the snap ring 470.

The ratio and proportioning function of the alternate valve 110' is very similar to that of the preferred valve 110. Like the preferred valve, the alternate valve provides a proportioning function which changes once the signal pressure exceeds a transition pressure $P_t$. The transition pressure however is fixed and is determined by the spring constant of the spring 472. The transition pressure $P_t$ of the alternate valve 110' will not vary in response to fluctuations or reductions in reservoir pressure as it does in the preferred valve 110.

The valve 110' operates as follows. When enabled (when a trailer is not attached), signal pressure conveyed by the signal conduit 118, is introduced through the input signal pressure port 412 into the input chamber 444. The pressure, applied to an effective pressure area A1 of the inner piston 436 urges it upwardly. The movement of the inner piston 436 will also cause associated movement in the outer piston 434 which is coupled to the inner piston 436 through the spring 472. The upward displacement of the inner piston 436 will separate the inlet valve seat 446 from the inlet/exhaust valve 449 allowing pressurized air to flow between the input chamber 444 and the delivery chamber 424. The pressure communicated to the delivery chamber will act on the total effective pressure area defined by A2 of the inner piston and A3 of the outer piston. For signal pressures less than a transition pressure $P_t$ the following will occur. When the pressure conveyed to the delivery pressure chamber acting on the combined effective pressure areas A2 plus A3 exerts a force greater than the force produced by the signal pressure acting on A1, both the outer piston 434 and the inner piston will be displaced downwardly in a concerted movement and seal off the input chamber 444 from the delivery chamber 424.

The ratio of the input signal pressure to the output signal pressure for signal pressures less than $P_t$ will be related to the ratio between A1 and, A2 plus A3. Because the delivery pressure exerts its force on a total effective pressure area (A2 plus A3) which is much greater than the effective pressure area to which the signal pressure applies its force (A1), the pressure delivered to the delivery pressure chamber 424 before communication is terminated will be substantially less than the signal pressure conveyed to the input pressure chamber 444.

Once the input signal pressure exceeds $P_t$ the valve 110' will enter into different functional mode similar to the mode displayed by the preferred valve 110. In this mode of operation, the signal pressure (greater than $P_t$) conveyed to the delivery pressure chamber 424 and acting on the total effective pressure area A2 plus A3 will effect movement in the outer piston 434 relative to the inner piston 436. The outer piston will move downwardly independent of the inner piston 436 until the delivery pressure created force applied to the effective pressure area A3 equals or exceeds the force generated by the compression of the spring 472 which occurs when the outer piston 434 is displaced downwardly relative to the inner piston 436. In this mode of operation, the pressure differential between the input signal pressure and the pressure delivered to the delivery pressure chamber will gradually decrease as signal pressures exceed $P_t$. Expressed another way, high signal pressures (generated by maximum treadle compression) will override the ratio and proportioning function of the valve and the valve will deliver a non-proportioned signal pressure to the delivery chamber and, hence, to the rear relay valve 108.

The disabling apparatus of the alternate valve 110', although functionally similar to that of the preferred valve 110, is mechanically simpler. The feedback conduit 80a conveys the emergency supply pressure in conduit 80 (when a trailer is attached) to the alternate valve 110'. This pressure is introduced to the valve via the port 414 and is communicated to a disabling pressure chamber 480 defined by the bore 408, the step 410, and a lower surface 482 of the outer piston 434. The pressure introduced to the chamber 480 acts on an area A4 of the outer control piston 434. This pressure will drive the outer piston upward and will carry with it the inner piston 436 to which it is coupled by the snap ring 470. The forced displacement of the pistons 434, 436 will establish an unrestricted communication between the input chamber 444 and the delivery chamber 424 and will in effect disable the ratio and proportioning function of the valve. The signal pressure will flow unimpeded from the conduit 118 to the conduit 126 and under these operating conditions, will effect non-reduced braking of the rear tractor brakes.

As was previously discussed, the alternate valve 110' does not communicate with the reservoir pressure as does the preferred valve 110. Thus, if this valve is employed in the brake system, the conduit 124a would not be present. The valve 110' would only communicate with the conduits 118, 126 and 80a.

Although the invention has been described with a certain degree of particularlity, it is understood that various changes and modifications can be made to it by those skilled in the art without departing from the spirit or scope of the invention as described and hereinafter claimed.

I claim:

1. A brake system for a tractor unit of a tractor-trailer vehicle, the system being connectable to a trailer carried brake system, comprising:
    (a) a source of pneumatic pressure;
    (b) friction brakes mounted on each wheel of the tractor unit, each of said brakes being energized by an associated pneumatically operated brake actuator;
    (c) an operator controlled valve for generating a signal pressure in proportion to an amount of operator action;
    (d) a first valve means communicating with said operator valve for controlling the flow of pneumatic pressure from the source to the front brake actuators;
    (e) a second valve means communicating with said operator valve for controlling the flow of pneumatic pressure from the source to the rear brake actuators;
    (f) a trailer service brake conduit for conveying pneumatic pressure from the tractor brake system to a trailer service brake sub-system, said conduit being generally at atmospheric pressure when not connected to a trailer brake system and said conduit being at a pressure porportional to the amount of operator action when said conduit is connected to a trailer brake system;
    (g) a trailer emergency brake conduit for conveying pneumatic pressure from the tractor brake system to a trailer emergency brake sub-system, said conduit being generally at atmospheric pressure when not connected to a trailer brake system and said conduit being at a predetermined pressure when said conduit is connected to a trailer emergency brake system;

(h) a variable flow proportioning means responsive to pneumatic pressure in said emergency conduit, disposed intermediate the operator valve and second valve means, for reducing the flow of signal pressure from said operator valve to said second valve means when a trailer is not connected to the tractor; and, (i) pressure feedback means communicating the fluid pressure in said service brake conduit to said first valve means such that the output of said first valve means is reduced by the pressure in said conduit.

2. The brake system of claim 1 wherein said variable flow proportioning means includes a control piston means which substantially reduces the flow of signal pressure to said second valve means when said signal pressure is within a predetermined pressure range, said control piston means decreasingly reducing said flow of signal pressure when said signal pressure is beyond said range.

3. In a brake system for a tractor unit of a tractor-trailer vehicle, having a source of pressurized fluid, a valve means for reducing the flow of pressurized fluid to a certain of said brake actuators when operating without a trailer, comprising:
 (a) a housing structure defining a plurality of ports;
 (b) flow passage means communicating an input port with an output port;
 (c) a valve member interposed in said flow passage means for reducing the flow of pressurized fluid;
 (d) valve member disabling means for rendering said valve member inoperative thereby allowing non-restricted fluid pressure flow through said flow passage means under predetermined vehicle operating conditions; and,
 (e) source pressure biasing means urging said valve member towards a flow reducing position.

4. A brake porportioning system for the tractor unit of a tractor trailer vehicle comprising:
 (a) a source of pneumatic pressure;
 (b) pneumatic pressure operated brake actuators for engaging friction brakes on the front and rear wheels of said tractor;
 (c) front and rear relay valve means for controlling the flow of pressure from the source to the brake actuators;
 (d) treadle means for generating a signal pressure in proportion to the extent of movement in an operator actuated treadle;
 (e) structure defining two flow paths, one flow path for conveying the signal pressure to the front relay valve means and the other flow path for conveying the signal pressure to the rear relay valve means; and,
 (f) a variable porportioning valve means disposed in one of said flow paths and responsive to trailer-attached and trailer-detached conditions, said proportioning valve means reducing the flow and application of signal pressure to one of said relay valve means so that reduced braking is effected on the rear wheels of the tractor when operating without a trailer.

5. A brake system for the towing unit of a vehicle having a detachable towed unit, comprising:
 (a) a source of pressurized fluid:
 (b) at least one front and one rear fluid pressure operated brake actuator for engaging wheel mounted friction brakes;
 (c) valving for controlling the flow and application of pressurized fluid from the source to said actuators, including:
  (i) treadle valve means for generating a signal pressure in proportion to the extent of treadle movement;
  (ii) relay valve means communicating with said treadle valve means and responsive to said signal pressure, such that said relay valve means provides pressurized fluid to one of said actuators in relation to treadle movement;
  (iii) variable flow proportioning means disposed in a signal pressure flow path, intermediate the treadle valve means and said relay valve means, said proportioning means responsive to towed unit detached and attached conditions, and operative to affect the flow of signal pressure to said relay valve means so that under one condition, the flow of pressurized fluid to said other actuator in a first function of treadle movement and in the second condition, the fluid pressure flow to said other actuator is a second function of treadle movement.

6. The brake system of claim 5, wherein said flow proportioning means includes a control piston means which substantially affects the flow and application of signal pressure to said relay valve means when the signal pressure is within a predetermined pressure range, said control piston means having a diminishing affect on the flow of signal pressure when the signal pressure is beyond said pressure range.

7. The brake system of claim 5 further including a first conduit connectable to an emergency brake sub-system on said towed unit, the fluid in said conduit being at atmospheric pressure when not connected to the towed unit and at a predetermined pressure when connected to the towed unit.

8. The brake system of claim 7 wherein said flow proportioning means communicates with said conduit and is responsive to the fluid pressure therein.

9. The brake system of claim 7 wherein said variable proportioning means comprises:
 (a) structure defining a flow passage bounded by an inlet and an outlet;
 (b) a control piston means disposed in the flow passage, said control piston means operative to ratio and proportion fluid pressure flow through said flow passage; and,
 (c) a disabling piston means having an effective pressure area communicating with the fluid pressure in said first conduit such that a predetermined pressure in said conduit causes said disabling piston means to engage and displace said first piston means to a position allowing unobstructed flow through said flow passage.

10. The brake system of claim 5 wherein said relay valve means comprises front and rear relay valves communicating with said brake actuators, and said flow porportioning means comprises a ratio and porportioning valve disposed in a flow path intermediate the treadle valve and one of said relay valves.

11. The brake system of claim 10 wherein said ratio and proportioning valve includes structure having an inlet and outlet and a flow passage therebetween, said valve further including a control piston means disposed in said flow passage, said control piston means having opposing effective pressure areas for providing flow through said flow passage as a function of the ratio of the effective pressure areas.

12. The brake system of claim 10 wherein said ratio and proportioning valve further includes a disabling piston means responsive to one of said conditions and is operative to disable said ratio and proportioning valve to allow non-proportioned fluid flow through said valve.

13. The brake system of claim 12 further including:
   (a) a first conduit connectable to an emergency brake sub-system on said towed unit, said conduit being generally at atmospheric pressure when not connected to said towed unit and at a predetermined pressure when connected; and,
   (b) a second conduit connectable to a service brake sub-system on said towed unit, said second conduit being generally at atmospheric pressure when not connected to said towed unit and at a pressure related to the degree of treadle depression when connected to said towed unit.

14. The brake system of claim 13 wherein said disabling piston means communicates with the pressure in said first conduit, said predetermined pressure displacing said disabling piston means to cause disablement of the ratio and proportioning valve.

15. The brake system of claim 9 or 11 wherein said control piston means comprises:
   (a) a first piston for controlling flow through said flow passage in a first proportion; and,
   (b) a second piston engageable with said first piston, such that when engaging said first piston, said first piston controls flow through said flow passage in a second proportion;
   (c) said second piston being biased out of engagement with said first piston by a predetermined fluid pressure.

16. The brake system of claim 10 wherein said ratio and proportioning valve is disposed in a flow path intermediate the treadle valve and the rear relay valve, said ratio and proportioning valve reducing pressure flow from said treadle valve to said rear relay valve when the towed unit is detached.

17. The brake system of claim 13 wherein said front relay valve is a dual mode relay valve having a brake proportioning chamber communicating with said second conduit, the pressure communicated to said chamber acting upon a valve operating means in opposition to the pressure from said treadle valve such that the output of said front relay valve is reduced by the pressure in said second conduit.

18. In a brake system for a tractor unit of a tractor trailer vehicle, having a source of pneumatic pressure, pneumatic pressure operated brake actuators for engaging front and rear wheel brakes on the tractor, and a means for connecting the system to a trailer carried brake system, a treadle operated control valve means, comprising:
   (a) a treadle valve for generating a signal pressure in relation to movement in an operator actuated treadle;
   (b) relay valve means for controlling the flow and application of pneumatic pressure from the source to the actuators;
   (c) means communicating the signal pressure from said treadle valve to said relay valve means such that pneumatic pressure is provided to at least one of said actuators in relation to the degree of treadle movement; and
   (d) flow proportioning means responsive to trailer-detached and trailer-attached conditions, and operative to affect the flow of signal pressure to said relay valve means such that under one condition the flow of pneumatic pressure to said other actuator is a first function of treadle movement and in the second condition, the flow of pneumatic pressure to said other actuator is a second function of treadle movement.

19. The control valve means of claim 18 wherein said flow proportioning means includes a flow control element biased by source pressure towards a flow reducing position.

20. A brake proportioning system for the tractor unit of a tractor trailer type vehicle comprising:
   (a) a source of pressurized fluid;
   (b) fluid pressure operated brake actuators for engaging front and rear wheel brakes on said tractor;
   (c) front and rear valve means for controlling the flow of pressurized fluid from the source to the front and rear brake actuators respectively;
   (d) fluid pressure proportioning means responsive to trailer-unattached and trailer-attached conditions;
   (e) at least one flow control member in said fluid proportioning means for reducing the output pressure of one of said valve means when said fluid proportioning means is sensing one of said conditions; and
   (f) fluid biasing means urging said flow control member towards a position wherein the output pressure of the one valve means is reduced.

21. The brake proportioning system of claim 20 wherein said one valve means is the rear valve means and the sensed condition is the trailer-unattached condition.

22. A brake proportioning system for the trailer unit of a tractor-trailer type vehicle comprising:
   (a) a source of pressurized fluid;
   (b) fluid pressure operator brake actuators for engaging front and rear wheel brakes on said tractor;
   (c) front and rear valve means for controlling the flow and application of pressurized fluid to the front and rear brake actuators respectively;
   (d) a first conduit means for conveying pressurized fluid from the tractor to a trailer brake subsystem, said conduit means being generally at atmospheric pressure when a trailer is not connected to the tractor, and at a predetermined pressure when a trailer is connected to a tractor;
   (e) fluid pressure proportioning means communicating with said first conduit means;
   (f) a flow control member in said fluid pressure porportioning means operative to reduce the output pressure of the rear valve means when the fluid pressure in said first conduit means is atmospheric;
   (g) fluid biasing means urging said flow control member towards a position that effects reduced output pressure of said rear valve means.

23. The brake proportioning system of claim 20 or 22 wherein said fluid biasing means is supplied by the source of pressurized fluid.

* * * * *